Sept. 12, 1933.  V. BENDIX  1,926,361
BRAKE
Filed Sept. 27, 1928
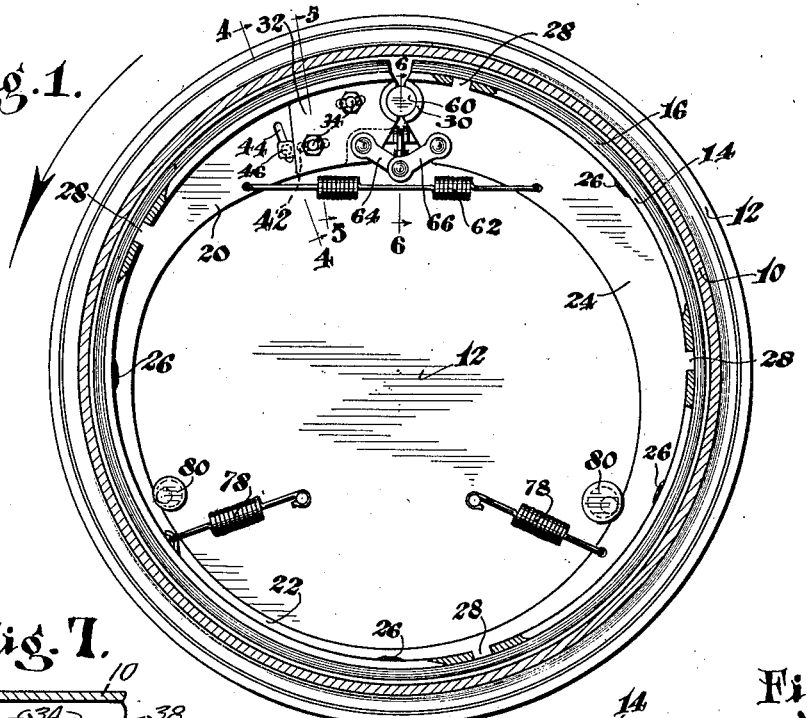
Fig. 1.
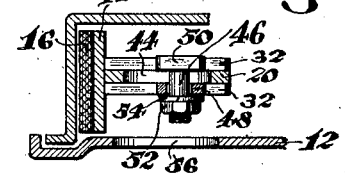
Fig. 4.
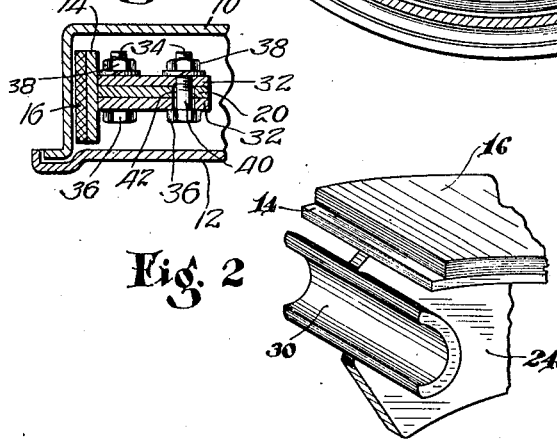
Fig. 7.
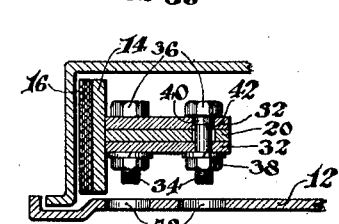
Fig. 5.
Fig. 2.
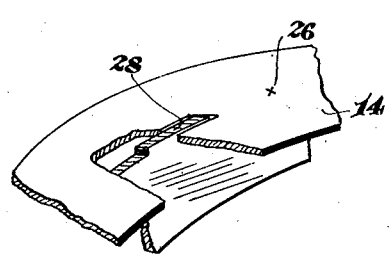
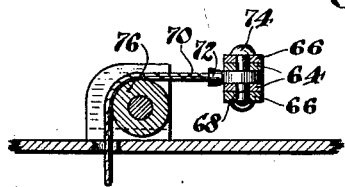
Fig. 6.
Fig. 3.
INVENTOR.
Vincent Bendix
BY
M. W. McConkey
ATTORNEY.

Patented Sept. 12, 1933

1,926,361

UNITED STATES PATENT OFFICE 1,926,361

BRAKE

Vincent Bendix, Chicago, Ill., assignor to Bendix Brake Company, South Bend, Ind., a corporation of Illinois Application September 27, 1928
Serial No. 308,743

5 Claims. (Cl. 188—79.5)

This invention relates to brakes and is illustrated as embodied in an internal expanding continuous band type of automotive brake.

The principal object of the invention is to produce an efficient and smoothly operating brake of this type and having this object in view I preferably so design the friction member as to secure its intimate contact with the drum, while at the same time retaining absolute control over it. Preferably the band is relatively flexible intermediate its anchoring ends, the wrapping or "servo" effect being greatest at this section, and tapers to a substantially rigid construction at said ends to obviate "grabbing" or locking of the band.

By constructing my band of varying degree of flexibility a high degree of self-energization is made possible due to the wrapping effect of the most flexible portion which delivers an actuating force, absorbed from the rotating drum, to either one of the more rigid sections adjacent the torque taking anchors. Furthermore making a considerable portion of the band flexible makes possible the ability to select easily across any given diameter or, in other words, to distort itself during the brake applying action to all possible eccentric positions of the drum. High pressure areas are thus obviated.

Further features of my invention relate to a novel means for securing the web of the shoe to the rim; to a novel semitubular structure at the web ends; to a novel means involving the web structure, for compensating for band wear; to a novel brake actuating toggle member, and to various other combinations of parts and desirable particular constructions which will be apparent from the following description of the illustrative embodiment shown in the accompanying drawing, in which:

Figure 1 is a vertical section through the drum flange taken just inside the head of the drum and indicating my novel brake in side elevation;

Figure 2 is an enlarged perspective view indicating the end structure of the band;

Figure 3 is a fragmentary perspective of the band with its web indicating one of the means for securing the two together;

Figure 4 is a section taken on the line 4—4 of Figure 1 indicating my novel wear adjusting means;

Figure 5 is a section taken on the line 5—5 of Figure 1 indicating the novel web and wear plate connection; and Figure 6 is a section taken on the line 6—6 of Figure 1 disclosing the novel toggle applying structure in more detail.

Figure 7 is a view similar to Figure 5 indicating a modified form of web and wear plate connection.

In the embodiment selected for illustration, 10 indicates a conventional brake drum at the open side of which is a suitable support such as a backing plate 12, and within which is arranged my novel friction means including a continuous band or rim 14 provided on its outer face with suitable brake lining 16 or other friction material forming a friction face for the band. At or about its transverse center the band is preferably provided with a stiffening web portion extending at right angles, or substantially so, to the band and characterized by its being longitudinally tapered. Describing this taper with more particularity I preferably provide a relatively short sector 20 adjacent one end of the web, which sector is of substantial depth, tapering rapidly, as indicated in Figure 1, to merge into a sector 22 of relatively short depth, thence tapering to a third sector 24 of substantial length and depth adjacent the other end of the band.

I preferably secure the web to the rim of my friction device by a series of spaced spot welds indicated at 26 in Figures 1 and 3 and further obviate relative rotation and consequent shearing action between these parts by a plurality of short projections 28 on the web fitting into corresponding openings in the rim.

As one feature of my invention I provide novel anchor thrust members 30 preferably shaped as half tubular sections of wear resisting high carbon steel of a width substantially equal to the width of the rim 14. Each end of the friction device may be provided with such a thrust member, the same being fixedly secured thereto as by welding.

According to a further feature of my invention, I provide a novel means for adjusting the overall length of band for lining wear, which means comprises detachable plates 32 one positioned on each side of the web sector 20, as indicated in Figure 5, and. together constituting one end of the friction device, the half-tubular member 30 being secured thereto. Plates 32 are preferably adjustably secured to the sector 20 by bolts 34 each having an integral head 36 contacting the inner plate, passing through and closely fitting an opening in the web and frictionally clamping the plates to the web by nuts 38. The bolts may be provided with flats 40 fitting in elongated slots 42 in the plates, thus guiding the plates in their lengthwise movement.

As a means for giving relative movement to the web and plates in the adjusting operation, I may provide the web sector 20 with a slot 44 preferably inclined with respect to the end edges of plate 32 and adapted to house a bolt 46 slidable therein and which bolt may be provided, on one side of the web, with a loosely mounted square sleeve 48 and contacting the edge of the plate 32.

The bolt and sleeve are held in their assembled position by the integral bolt head 50 similar in outline to the sleeve 48, together with a detachable nut 52, lock washer 54 being preferably positioned adjacent to nut 52. Suitable openings 56 and 58 may be provided in the backing plate 12 to facilitate adjustment of the plates from outside the brake without demounting the wheel, although I may dispense with said openings as disclosed in Figure 7, reversing the integral and detachable nuts on bolts 34 and 46, thus compelling adjustment from inside the brake.

Adjustment of the plates may be effected by simply loosening the nuts 38 and 52 and tapping the cam bolt 46 with its square sleeve and head downward, thus driving the plates 32 toward the anchor pin 60 against the tension of return spring 62, the latter holding the band anchored in its inoperative position against the anchor pin 60. Once the plates are correctly positioned the nuts 38 and 52 are tightened. The square sleeve 48 and bolt head 50 thus act both as cams in effecting the adjusting operation and as stops to transmit the braking thrust from the plate to the web.

The brake may be applied, that is the ends of the band separated, by a novel toggle arrangement comprising links 64 and 66 each pivoted at one end to an end of the web end at its other end to a connecting shaft 68. A tensioning element such as a flexible cable 70 is preferably secured, as by an eye bolt 72, to the shaft 68 extending vertically upward at 74, thence over any suitable bearing support such as pulley 76 which may be suitably bracketed in the plate.

In operation, movement of the tensioning element by the service pedal spreads the toggle to force the ends of the band apart against the action of return springs 62 and 78. With the drum rotating counterclockwise in forward braking and as indicated by the arrow in Figure 1, the more flexible sector 22 is urged about the rapidly rotating drum, due to the wrapping effect thereof, resulting in a powerful servo action to drive the rigid sector 24 into firm drum contact and against the anchor 60. Upon release of the brake the return springs urge the band against eccentric adjustable stops 80 and anchor 60.

Adjustment of the plates 32 results in a more powerful braking due to the flattening of the toggle, but this may be compensated for by arrangement of the brake linkage to lessen the mechanical advantage of the hookup as the toggle increases it.

While one illustrative embodiment of the invention has been described in detail, it is not my intention to limit the scope of the invention to that particular embodiment, or otherwise than by the scope of the appended claims.

I claim:

1. A brake comprising a friction member having a reinforcing web centrally welded thereto, together with means for increasing the length of said web, said means including thrust plate members, secured thereto and extending one on either side of said web at the end thereof, said plates being frictionally and adjustably clamped to said web.

2. A brake comprising a friction member having a thrust plate connected to one end thereof, said plate constructed and arranged to be moved relative to said member by a radially movable cam supported by a portion of said friction member.

3. Adjusting means for a brake structure comprising a cam including a supporting shaft and a thrust member of square outline loosely sleeved on said shaft.

4. A brake device comprising an anchor-engaging member having a pair of parallel web-embracing plates welded thereto.

5. A brake device comprising a transverse semi-cylindrical anchor-engaging member having a pair of parallel web-embracing plates welded thereto.

VINCENT BENDIX.